United States Patent
Espinasse et al.

(10) Patent No.: US 9,939,098 B2
(45) Date of Patent: Apr. 10, 2018

(54) INTERMEDIATE COUPLING FOR CONNECTING RIGID PIPE ELEMENTS FOR CONVEYING A FLUID, AND ASSOCIATED PIPE NETWORK AND ASSEMBLY METHOD

(71) Applicant: TECHNIP FRANCE, Courbevoie (FR)

(72) Inventors: Philippe Espinasse, Bihorel (FR); Olivier Rageot, Paris (FR)

(73) Assignee: TECHNIP FRANCE (FR)

( * ) Notice: Subject to any disclaimer, the term of this patent is extended or adjusted under 35 U.S.C. 154(b) by 283 days.

(21) Appl. No.: 14/422,585

(22) PCT Filed: Aug. 9, 2013

(86) PCT No.: PCT/EP2013/066740
§ 371 (c)(1),
(2) Date: Feb. 19, 2015

(87) PCT Pub. No.: WO2014/029644
PCT Pub. Date: Feb. 27, 2014

(65) Prior Publication Data
US 2015/0192236 A1    Jul. 9, 2015

(30) Foreign Application Priority Data

Aug. 20, 2012    (FR) .................................... 12 57879

(51) Int. Cl.
*F16L 53/00*    (2006.01)
*F16L 59/14*    (2006.01)
*F16L 41/02*    (2006.01)

(52) U.S. Cl.
CPC ........... *F16L 53/004* (2013.01); *F16L 41/021* (2013.01); *F16L 53/008* (2013.01); *F16L 59/14* (2013.01); *Y10T 29/49002* (2015.01)

(58) Field of Classification Search
CPC ....... F16L 53/00; F16L 53/001; F16L 53/004; F16L 53/005; F16L 53/008
(Continued)

(56) References Cited

U.S. PATENT DOCUMENTS 2,409,304 A * 10/1946 Morrison ................ E03L 37/10
138/111
2,723,108 A * 11/1955 Butler ...................... C01D 1/04
137/74

(Continued)

FOREIGN PATENT DOCUMENTS

DE    33 00 443 A1    7/1984
DE    90 00 710 U1    3/1990
(Continued)

OTHER PUBLICATIONS

International Search Report dated Aug. 29, 2013 issued in corresponding to International patent application No. PCT/EP2013/066740.

(Continued)

*Primary Examiner* — Aaron M Dunwoody
(74) *Attorney, Agent, or Firm* — Ostrolenk Faber LLP

(57) ABSTRACT

A coupling that includes a rigid inner shell, a rigid outer shell positioned around the inner shell to define an intermediate space that contains an electric line and a thermally insulating layer, and an electric connecting line for heating fluid that flows in the inner shell.

17 Claims, 2 Drawing Sheets

(58) Field of Classification Search
USPC .................................... 285/133.11, 47, 41
See application file for complete search history.

(56) References Cited

U.S. PATENT DOCUMENTS

| | | | |
|---|---|---|---|
| 4,069,409 A | | 1/1978 | Noland et al. |
| 4,384,905 A | * | 5/1983 | Gros ................... B29C 44/1242 156/294 |
| 4,465,307 A | * | 8/1984 | de Lange .............. F16L 59/163 138/149 |
| 4,488,739 A | * | 12/1984 | de Lange .............. F16L 59/163 138/149 |
| 4,514,241 A | * | 4/1985 | Maukola ................. F16L 59/16 138/155 |
| 4,590,346 A | * | 5/1986 | Sugihara .................. C21D 1/42 148/520 |
| 4,815,769 A | * | 3/1989 | Hopperdietzel .......... B05B 1/24 138/33 |
| 4,915,121 A | * | 4/1990 | Rains ........................ F16L 7/00 137/15.04 |
| 5,127,441 A | * | 7/1992 | Rains ........................ F16L 7/00 138/103 |
| 5,714,738 A | * | 2/1998 | Hauschulz ............ F16L 53/005 138/33 |
| 5,803,127 A | * | 9/1998 | Rains ........................ F16L 7/00 138/113 |
| 5,890,747 A | * | 4/1999 | Brockhage ............ F16L 39/005 285/123.2 |
| 6,428,054 B1 | * | 8/2002 | Zappa ................... B29C 65/342 285/123.1 |
| 7,708,923 B1 | * | 5/2010 | Helicke ............ B29C 45/14598 264/261 |
| 2008/0085220 A1 | * | 4/2008 | Felix ..................... F16L 53/008 392/437 |
| 2008/0187300 A1 | * | 8/2008 | Scarzella ............. F16L 53/008 392/465 |
| 2008/0307737 A1 | | 12/2008 | Pirogovsky et al. |
| 2010/0282355 A1 | * | 11/2010 | Seyler .................... F16L 11/04 138/140 |
| 2011/0056931 A1 | * | 3/2011 | Schlipf ............... B29C 45/2737 219/548 |
| 2011/0175346 A1 | * | 7/2011 | Grieser-Schmitz .. C08G 18/225 285/47 |
| 2013/0048128 A1 | * | 2/2013 | Roederer ................ B64D 11/02 138/33 |
| 2013/0248013 A1 | * | 9/2013 | Chakkalakal ......... F16L 53/002 137/334 |
| 2013/0340970 A1 | * | 12/2013 | Lytton ..................... F16L 53/00 165/53 |
| 2014/0270739 A1 | * | 9/2014 | Rosvold .................. E21B 43/01 392/468 |
| 2016/0138749 A1 | * | 5/2016 | Geertsen .............. F16L 53/008 392/480 |

FOREIGN PATENT DOCUMENTS

| | | |
|---|---|---|
| EP | 1 953 444 A2 | 8/2008 |
| WO | WO 94/04865 A1 | 3/1994 |
| WO | WO 02/16732 A1 | 2/2002 |

OTHER PUBLICATIONS

Written Opinion dated Aug. 29, 2013 issued in corresponding to International patent application No. PCT/EP2013/066740.

* cited by examiner

US 9,939,098 B2

INTERMEDIATE COUPLING FOR CONNECTING RIGID PIPE ELEMENTS FOR CONVEYING A FLUID, AND ASSOCIATED PIPE NETWORK AND ASSEMBLY METHOD

CROSS REFERENCE TO RELATED APPLICATIONS

The present application is a 35 U.S.C. § 371 National Phase conversion of PCT/EP2013/066740, filed Aug. 9, 2013, which claims benefit of French Application No. 1257879, filed Aug. 20, 2012, the disclosure of which is incorporated herein by reference. The PCT International Application was published in the French language.

TECHNICAL FIELD OF THE INVENTION

The present invention relates to an intermediate coupling for connecting rigid pipe elements for conveying a fluid, comprising:
an inner rigid shell, comprising:
   an inner section, the inner section delimiting an inner passage for a flow of fluid between a first end and a second end,
   at least one inner branch tapped on the inner section between the first end and the second end, the inner branch delimiting an inner aperture for a fluid flow emerging in the inner passage;
at least one electric connecting line, intended to heat the fluid flowing in the inner shell, the electric line being positioned outside the inner shell, the electric line having a first electrical connecting point situated on a first side of the inner branch, and a second electrical connecting point situated on a second side of the inner branch.

BACKGROUND OF THE INVENTION

Such a coupling is in particular designed to be used in a network of underwater hydrocarbon transport pipes. The pipe network is submerged in an expanse of water, in particular at a significant depth.

This network is for example designed to connect different wellheads to each other, or different pipeline end terminations (PLET) in order to collect the fluid taken from the different wells of an underwater oilfield and bring it to the surface through at least one riser.

In some cases, in particular at great depths, the temperatures of the expanse of water in which the pipe network is submerged can be low, for example several degrees Celsius.

In that case, the fluids transported through the pipe network may become very viscous. This reduces the flow rate of the fluid extracted outside the facility.

In the worst-case scenario, hydrate plugs may form and completely block the recovery of fluid through part of the facility.

In order to offset this problem, it is known to heat the fluid flowing in the pipes, either by passing electric current directly through the metal tube guiding the fluid, or by providing an electric heating line positioned between an inner metal tube containing the fluid and an outer metal tube. The latter configuration is designated by the term "Electrical Tracing Heated Pipe-In-Pipe" (ETH-PIP).

The electric heating lines are relatively easy to install in the annular space between the inner tube and the outer tube of a linear rigid pipe element. A layer of high-quality thermally insulating material, for example formed by an aerogel, is also introduced into the annular space, to provide good thermal insulation between the outside of the pipe element and the fluid flowing in the pipe element.

In some configurations, a T coupling, made up of a single metal shell, is mounted between three linear pipe elements to hydraulically connect those elements. The T coupling is respectively connected to a first double-shell pipe element and a second double-shall pipe element each containing an electric heating line.

Then, a water resistant insulating material is poured around the metal shell of the coupling. An electric connecting line is also positioned in the expanse of water around the coupling to electrically couple the electric heating lines of the pipe elements mounted on the coupling.

Such a coupling is not fully satisfactory. The insulating material surrounding the coupling provides thermal insulation lower than that of an insulating material contained in a double shell of a linear pipe element. A cold point may therefore appear at the coupling.

Furthermore, the electric connecting line is connected to the heating lines in a wet environment, directly in the expanse of water. A deterioration of the electrical connection, or even short circuits, may appear.

SUMMARY OF THE INVENTION

One aim of the invention is therefore to provide an intermediate coupling for connecting rigid pipes that allows a reliable extraction of the fluids that pass through it, while providing the desired fluid connections.

To that end, the invention relates to a coupling of the aforementioned type, characterized in that the coupling comprises a rigid outer shell positioned around the inner shell, the outer shell at least partially covering the inner section on either side of the inner branch, and the inner branch, the outer shell and the inner shell delimiting an intermediate space between them extending around the inner section and the inner branch, the electric line being received in the intermediate space, the coupling comprising a thermally insulating layer positioned in the intermediate space across from the inner section and across from the inner branch.

The coupling according to the invention may include one or more of the following features, considered alone or according to any technically possible combination(s):
   the electric line is placed in thermal contact with the inner shell to heat the fluid contained in the inner passage;
   it comprises an additional electric line positioned in the intermediate space, the additional electric line having a first line segment extending across from the inner section and a second line segment extending across from the inner branch;
   the thermally insulating layer fills substantially all of the intermediate space;
   the thermally insulating layer comprises an aerogel;
   the inner section has a part protruding outside the outer shell at least at one of the first end and the second end;
   it comprises, for the or each protruding part, a cover attached on the outer shell to cover the protruding part;
   the length of the inner section is less than 10 m;
   the inner shell is made in a single piece, the outer shell advantageously being made in a single piece;
   the outer shell comprises an outer section at least partially covering the inner section on either side of the inner branch and an outer branch tapped on the outer section and at least partially covering the inner branch, the intermediate volume delimited between the inner section and the outer section communicating with the intermediate volume delimited between the inner branch and the outer branch.

The invention also relates to a pipe network for conveying a fluid, designed to be submerged in the expanse of water, characterized in that it comprises:
- a coupling as defined above;
- a first rigid pipe element for conveying a fluid, coupled to the first end of the inner section;
- a second rigid pipe element for conveying a fluid, coupled to the second end of the inner section;
- a third rigid pipe element for conveying a fluid coupled to the inner branch.

The network according to the invention may include one or more of the following features, considered alone or according to any technically possible combination(s):
- the first rigid pipe element and the second rigid pipe element each comprise an inner fluid guide tube coupled to the inner section and an outer tube delimiting an annular space with the inner tube, the annular space receiving a thermally insulating layer and at least one electric line designed to heat the fluid contained in the inner tube, the electric lines of the first rigid pipe element and the second rigid pipe element being electrically coupled to each other by the electric connecting line;
- the inner section has a part protruding outside the outer shell at least at one of the first end and the second end, the coupling comprising a cover coupled to the outer shell and the outer tube to cover the protruding part;
- the electric connection between the electric line present in at least one of the first rigid pipe element and the second rigid pipe element on the one hand, and the electric connecting line on the other hand, is positioned between the protruding part and the cover.

The invention also relates to a method for assembling a pipe network for conveying a fluid below an expanse of water, comprising the following steps:
- providing a coupling as described above;
- fastening a first rigid pipe element to a first end of the inner section;
- fastening a second rigid pipe element to a second end of the inner section;
- connecting a third rigid pipe element to the inner branch;
- electrical coupling between at least one first electric line designed to heat the fluid present in the first rigid pipe element, and the electric connecting line present in the coupling;
- electrical coupling between at least one second electric line designed to heat the fluid present in the second rigid pipe element, and the electric connecting line present in the coupling.

The invention also relates to a method for conveying fluid through an expanse of water comprising the following steps:
- providing a pipe network as defined above;
- causing fluid coming from the first rigid pipe element to flow through the coupling toward one and/or the other of the second rigid pipe element and the third rigid pipe element;
- heating the fluid flowing through the coupling via the electric connecting line.

BRIEF DESCRIPTION OF THE DRAWINGS

The invention will be better understood upon reading the following description, provided solely as an example and done in reference to the appended drawings, in which.

DESCRIPTION OF PREFERRED EMBODIMENTS

Figure 1:
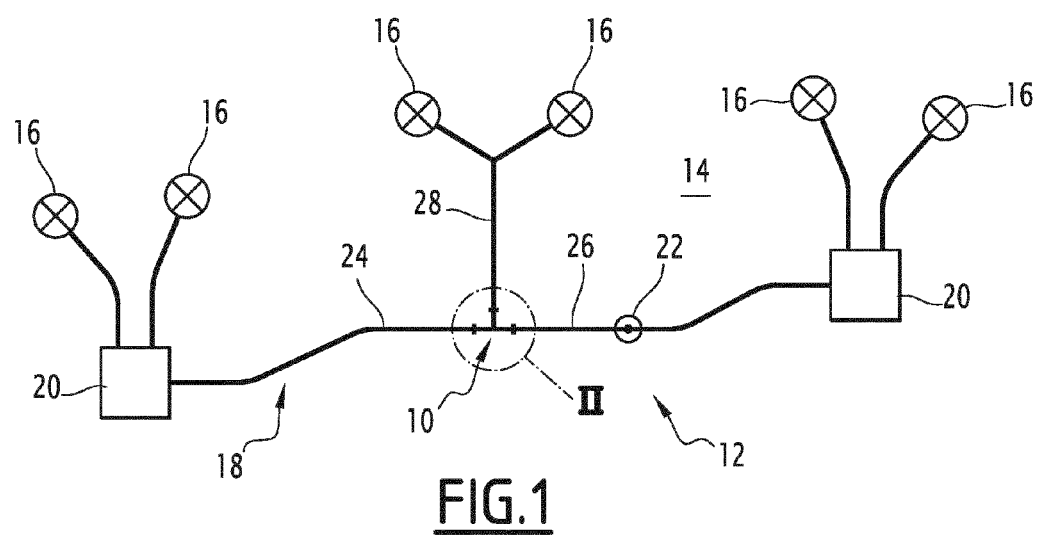
FIG. 1 is a diagrammatic top view of a first pipe network for conveying fluid submerged in an expanse of water comprising an intermediate connecting coupling according to the invention.
Figure 3:
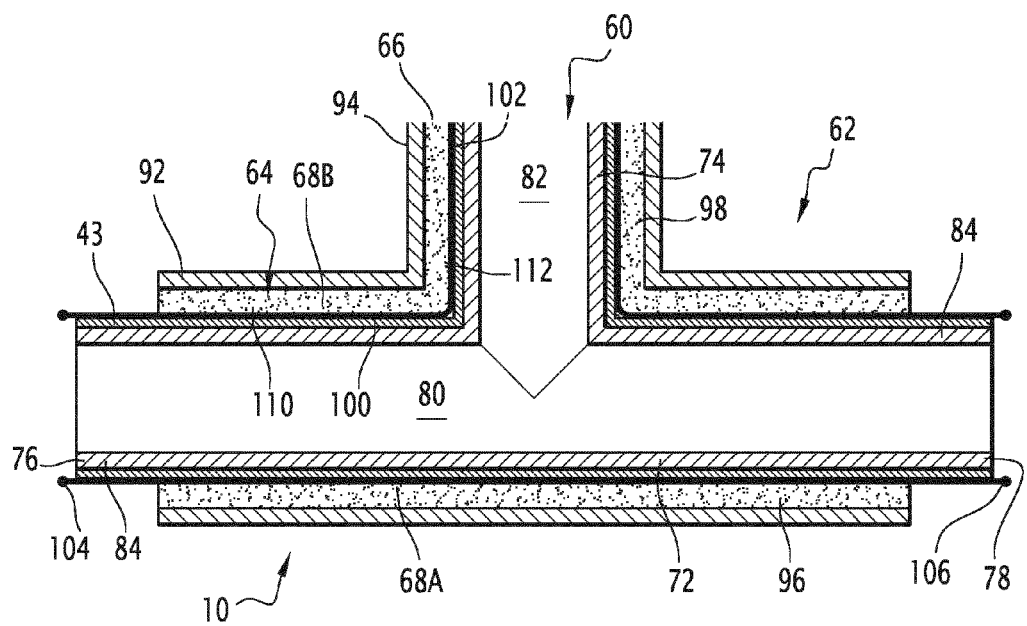
FIG. 3 is a diagrammatic view similar to FIG. 2 of the intermediate coupling according to the invention, before its assembly.
Figure 2:
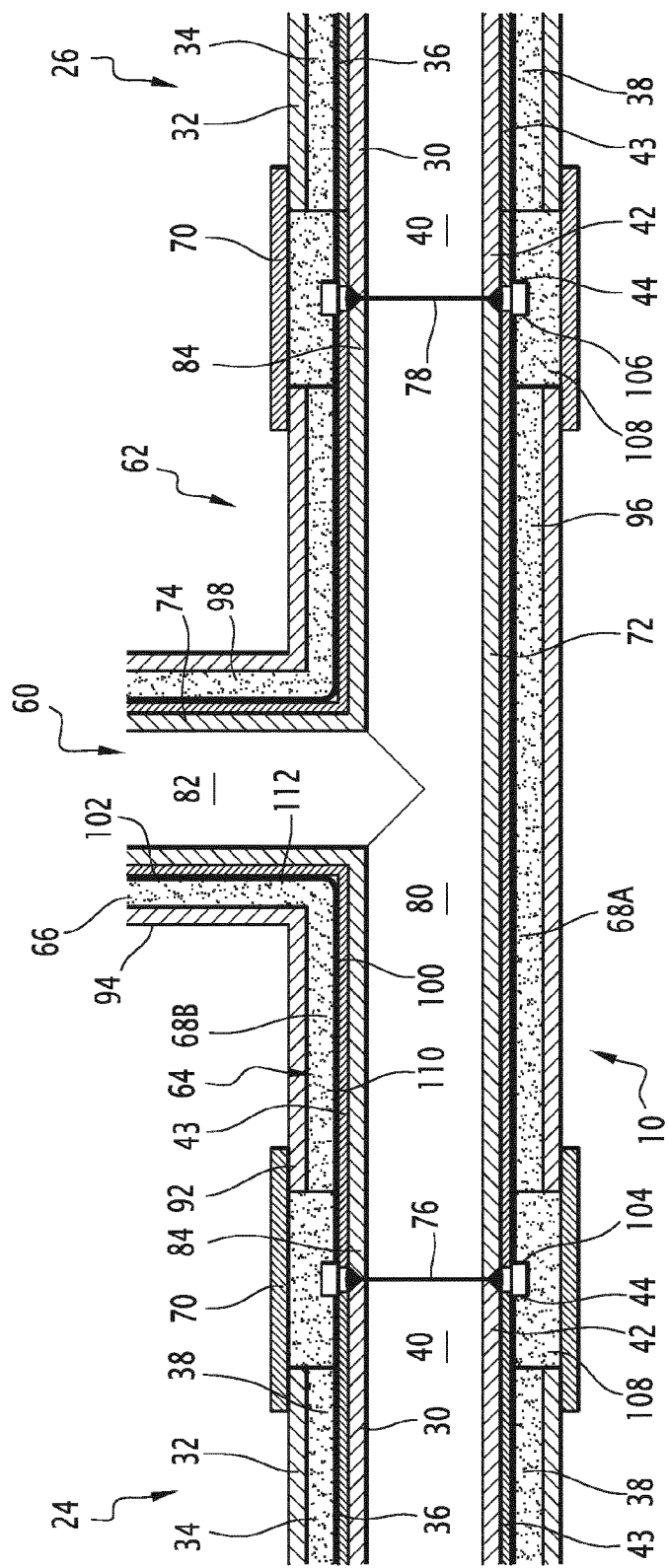
FIG. 2 is a diagrammatic view, in cross-section along the median plane, of a detail marked II in FIG. 1, illustrating the intermediate coupling and the pipe elements to which it is connected.

A first intermediate connection coupling 10 according to the invention is diagrammatically illustrated in FIGS. 1 to 3.

The intermediate coupling 10 is designed to be mounted in a facility 12 for exploiting and conveying a fluid through an expanse of water 14, shown in top view in FIG. 1.

The expanse of water 14 is for example a sea, ocean or lake. The depth of the expanse of water 14 is generally greater than 100 m and is for example comprised between 1000 m and 4000 m.

In the example of FIG. 1, the facility 12 comprises a plurality of wells 16 arranged in the bottom of the expanse of water 14 to withdraw fluid.

The fluid withdrawn and conveyed in the facility 12 is advantageously a hydrocarbon such as oil or natural gas.

The facility 12 comprises a network 18 of rigid pipes placed on the bottom of the expanse of water 14, coupling and fluid collection elements 20, such as pipeline end terminations (PLET), and at least one riser 22, designed to convey the fluid flowing in the network 18 toward the surface of the expanse of water 14.

As illustrated by FIGS. 1 and 2, the network 18 comprises a first rigid pipe element 24 for conveying a fluid, a second rigid pipe element 26 for conveying a fluid, and a third rigid pipe element 28 for conveying a fluid, the elements 24 to 28 being coupled to each other by a coupling 10 according to the invention.

The rigid pipe elements 26 to 28 have similar structures. In reference to FIG. 2, each element 26 to 28 thus has an inner metal tube 30 designed to guide the fluid, an outer metal tube 32 delimiting an intermediate space 34 with the inner tube 30, and a thermally insulating layer 36 positioned in the intermediate space 34.

Each pipe element 26 to 28 further comprises at least one electric line 38 designed to heat the fluid flowing through the inner tube 30, the line 38 being received in the intermediate space 34.

The inner metal tube 30 delimits a central aperture 40 for the flow of a fluid that emerges at each end of the tube 30. Near the coupling 10, the tube 30 has a region 42 protruding outside the outer tube 32.

The inner tube 30 for example has an outer diameter comprised between 10 cm and 100 cm.

The thermally insulating layer 36 fills substantially all of the intermediate space 34. It is for example formed by an aerogel. It has an overall heat transfer coefficient (OHTC) for example below 1 $W/m^2K$.

The electric line 38 is able to perform heating electric tracing on the inner tube 30, outside the tube 30. It is placed in thermal contact with the outer surface of the inner tube 30, either placed directly against the surface, or placed on a protective layer 43 of the outer surface such as a layer of fusion-bonded epoxy.

The electric line 38 is for example made by a cord of conductive cables or wires received in a metal sheath.

It for example has an elongated cross-section with a width larger than its thickness.

Near the coupling 10, the electric line 38 advantageously has an electric connecting termination 44 protruding outside the intermediate space 34.

The outer tube 32 surrounds the inner tube 30 and the thermally insulating layer 36. It generally has an outer diameter comprised between 10 cm and 100 cm.

As illustrated by FIGS. 2 and 3, the coupling 10 comprises a metal inner shell 60, designed to guide the fluid, and according to the invention, a metal outer shell 62 surrounding the inner shell 60 and delimiting a continuous intermediate space 64 with the inner shell 60.

The coupling 10 further comprises a thermally insulating intermediate layer 66 and at least one electric connecting line 68A, 68B, designed to heat the fluid, the layer 66 and each line 68A, 68B being received in a continuous intermediate space 64.

In the example of FIG. 2, the coupling 10 further comprises intermediate protective covers 70, coupling the outer shell 62 to the outer tube 32 of an adjacent pipe element 24, 26.

The coupling 10 is short. Its length is for example shorter than 10 m.

The inner shell 60 is preferably made in a single piece from metal. It comprises a tubular inner section 72 and at least one tubular outer branch 74 tapped on the inner section 72 between the ends 76, 78 of the inner section 72.

In this example, the inner shell 60 comprises a single outer branch 74. It is thus generally T-shaped. In one alternative (not shown), it is generally Y-shaped, or has several branches 74.

The inner section 72 has an outer diameter substantially equal to the outer diameter of the inner tube 30 of the pipe elements 24, 26 to which it is connected.

It delimits an inner passage 80 for the flow of a fluid emerging outwardly at the first end 76 and the second end 78.

The inner branch 74 is tapped on the inner section 72 between the first end 76 and the second end 78.

It advantageously has an outer diameter substantially equal to the outer diameter of the pipe element 28 on which it is coupled.

It inwardly defines an inner aperture 82 for a flow of fluid emerging in the inner passage 80 between the ends 76, 78.

In this example, the inner section 72 comprises a part 84 protruding outside the outer shell 62 at each end 78.

The outer shell 62 has a shape similar to that of the inner shell 60.

It is positioned around the inner shell 60 to at least partially cover that shell 60. The outer shell 62 outwardly delimits the intermediate space 64.

The outer shell 62 is made in a single piece from metal. It comprises a tubular outer section 92 positioned around the inner section 72 and, for each inner branch 74, an outer branch 94 tapped on the outer section 92.

Advantageously, the length of the outer section 92 is shorter than that of the inner section 72. It covers the inner section 72 on either side of the branch 74.

The outer section 92 has an outer diameter substantially equal to the outer diameter of the outer tube 32 of each pipe element 24, 26 on which the coupling 10 is connected.

The outer branch 94 is positioned around the inner branch 64.

The outer branch 62 is thus generally T-shaped. Alternatively, it is generally Y-shaped, or has several branches 94 each corresponding to an inner branch 74.

The intermediate space 64 comprises a first annular intermediate volume 96 situated between the inner section 72 and the outer section 92, and a second intermediate volume 98 situated between the inner branch 74 and the outer branch 94.

According to the invention, the intermediate space 64 is continuous. The second intermediate volume 98 emerges in the first intermediate volume 96 between the tap of the inner branch 74 on the inner section 72 and the tap of the outer branch 94 on the outer section 92.

The coupling 10 is fastened on the first pipe element 24, for example by welding, at the first end 76. It is fastened on the second pipe element 26, for example by welding, at the second end 78.

It is also fastened on the third pipe element 28.

In particular, each protruding region 42 of a pipe element 24, 26 is assembled on a protruding part 84 of the inner section 72. Each inner aperture 40 of a pipe element 24, 26 then emerges in the inner passage 80 and is hydraulically connected to the third pipe element 28 by the inner aperture 82.

The thermally insulating layer 66 extends in the intermediate space 64. It comprises a first part 100 positioned in the first inner volume 96 and a second part 102 positioned in the second inner volume 98.

Advantageously, the first part 100 and the second part 102 are connected to each other to provide continuous thermal insulation in the coupling 10.

Preferably, the thermally insulating layer 66 substantially completely fills, for example more than 50%, in particular more than 90%, the volume of the intermediate space 64.

The thermally insulating layer 66 being contained between the outer shell 62 and the inner shell 60, it is not placed in contact with the expanse of water 14 surrounding the coupling 10. It for example comprises an aerogel.

It thus has an overall heat transfer coefficient (OHTC) for example lower than 1 W/m²K.

The coupling 10 therefore does not constitute a cold point in the pipe network 18.

In this example, the coupling 10 comprises a first electric line 68A for heating the fluid extending through the first inner volume 96 between the inner section 72 and the outer section 92.

The coupling 10 advantageously has a second electric line 68B for heating the fluid extending partially in the first inner volume 96 and partially in the second inner volume 98.

Each electric line 68A, 68B is for example able to perform heating electric tracing on the inner shell 60, outside the inner shell 60. It is placed in thermal contact with the outer surface of the inner shell 60, placed either directly against the surface or on a protective layer 43 of the outer surface, such as a layer of fusion-bonded epoxy.

The electric line 68A, 68B is for example made by a cord of conductive cables or wires received in a metal sheath.

It for example has an elongated cross-section with a width larger than its thickness.

In reference to FIGS. 2 and 3, the first electric line 68A has, in this example, a first electric connecting end 104 situated near the first end 76, advantageously outside the outer shell 62, and a second electric connecting end 106, situated near the second end 78, advantageously outside the outer shell 62.

As illustrated by FIG. 2, the end 44 of the electric line 38 of the first pipe element 24 is connected to the first end 104, preferably by crimping.

The end 44 of the electric line 38 of the second pipe element 26 is connected to the second connecting end 106, preferably by crimping.

Thus, the electric connecting line 68A electrically couples the electric line 38 of the second pipe element 26 to the electric line 38 of the first pipe element 24, in the intermediate space 64, without being in contact with the expanse of water 14.

This makes it possible to produce dry electric connections between the lines 38, 68A, which increases the reliability of the heating of the fluid passing through the network 18.

Furthermore, the lines 38, 68A can be electrically coupled by simple crimping, without having to perform welding withstanding a wet environment.

As illustrated by FIG. 3, the second electric line 68B comprises a first line segment 110 extending across from the inner section 72 in the first volume 100 and a second line segment 112 extending across from the inner branch 74 in the second inner volume 102.

The second electric line 68B is therefore able to electrically couple an electric line 38 contained in one of the first pipe element 24 and the second pipe element 26 with an electric line contained in the third pipe element 28.

Each cover 70 is positioned around the protruding parts 42, 84, bearing between the outer tube 32 and the outer shell 62. The cover 70 is for example formed by two half-shells assembled on one another. A thermally insulating sleeve 108 is positioned in the intermediate volume defined between the protruding parts 42, 84 and the cover 70.

A method for assembling the pipe network 18 according to the invention will now be described.

This assembly method is for example implemented on land, or on a placement ship, on the surface of the expanse of water 14. Alternatively, this method is implemented directly below the expanse of water 14, using a hyperbaric chamber.

Initially, the coupling 10, a first pipe element 24 and a second pipe element 26 are provided.

For each end 76, 78 of the coupling 10, the exposed protruding parts 42, 84 are placed end to end and are fastened on one another, for example by welding.

Then, the electric connecting end 44 of the line 38 is electrically coupled to an electric connecting end 104, 106 of the connecting line 68A, for example across from the protruding parts 42, 84.

Next, the thermally insulating sleeve 108 is formed around the protruding parts 42, 84. The cover 70 is next placed around the sleeve 108 bearing on the outer tube 32 and on the outer shell 62.

Next, a third pipe element 28 is connected to the bridge 74 of the coupling 10, either directly as previously described, or by means of a valve.

The pipe network 18 can then be used. The heating lines 38 are electrically powered, and are connected to one another by the intermediate line 68A. The fluid flowing in the apertures 40 and the inner passage 80 is therefore heated respectively using the lines 38 and the line 68A, which decreases its viscosity, and prevents plugs from forming.

Owing to the coupling 10 according to the invention, it is possible to couple at least three tubular pipe elements 24, 26, 28 to each other, without creating a cold point at the coupling 10.

The double shell structure of the coupling 10 being similar to that of the pipe elements 24, 26, 28, it is easy to connect the coupling 10 on the pipe elements 24, 26, 28. This structure makes it possible to use high-quality thermal insulators in the coupling 10, and provide heating lines 68A, 68B through the coupling 10, without contact with the expanse of water 14. The electric connections are therefore done dry, for example by simple crimping.

What is claimed is:

1. An intermediate coupling for connecting rigid pipe elements for conveying a fluid, designed to be submerged in an expanse of water, comprising:
    an inner rigid shell, comprising:
        an inner section, the inner section delimiting an inner passage for a flow of fluid between a first end and a second end,
        at least one inner branch tapped on the inner section between the first end and the second end, the inner branch delimiting an inner aperture for a fluid flow emerging in the inner passage;
    at least one electric connecting line, intended to heat the fluid flowing in the inner shell, the electric line being positioned outside the inner shell, the electric line having a first electrical connecting point situated on a first side of the inner branch, and a second electrical connecting point situated on a second side of the inner branch,
    a rigid outer shell positioned around the inner shell, the outer shell at least partially covering the inner section on either side of the inner branch, and the inner branch, the outer shell and the inner shell delimiting an intermediate space between them extending around the inner section and the inner branch, the electric line being received in the intermediate space, the coupling comprising a thermally insulating layer positioned in the intermediate space across from the inner section and across from the inner branch,
    wherein the electric line is placed in thermal contact with the inner shell to heat the fluid contained in the inner passage, the electric line being placed either directly in contact against the outer surface of the inner shell or on a protective layer of the outer surface of the inner shell.

2. The coupling according to claim 1, comprising an additional electric line positioned in the intermediate space, the additional electric line having a first line segment extending across from the inner section and a second line segment extending across from the inner branch.

3. The coupling according to claim 1, wherein the thermally insulating layer fills substantially all of the intermediate space.

4. The coupling according to claim 1, wherein the thermally insulating layer comprises an aerogel.

5. The coupling according to claim 1, wherein the inner section has a part protruding outside the outer shell at least at one of the first end and the second end.

6. The coupling according to claim 5, comprising, for the or each protruding part, a cover attached on the outer shell to cover the protruding part.

7. The coupling according to claim 1, wherein the length of the inner section is shorter than 10 m.

8. The coupling according to claim 1, wherein the inner shell is made in a single piece.

9. The coupling according to claim 1, wherein the outer shell comprises an outer section at least partially covering the inner section on either side of the inner branch and an outer branch tapped on the outer section and at least partially covering the inner branch, the intermediate volume delimited between the inner section and the outer section communicating with the intermediate volume delimited between the inner branch and the outer branch.

10. The coupling according to claim 1, wherein the outer shell has a shape similar to that of the inner shell.

11. The coupling according to claim 1, characterized in that the outer shell is made in a single piece from metal.

12. A pipe network for conveying a fluid, designed to be submerged in an expanse of water, comprising:
    a coupling according to claim 1;
    a first rigid pipe element for conveying a fluid, coupled to the first end of the inner section;
    a second rigid pipe element for conveying a fluid, coupled to the second end of the inner section;
    a third rigid pipe element for conveying a fluid coupled to the inner branch.

13. The pipe network according to claim 12, wherein the first rigid pipe element and the second rigid pipe element each comprise an inner fluid guide tube coupled to the inner section and an outer tube delimiting an annular space with the inner tube, the annular space receiving a thermally insulating layer and at least one electric line designed to heat the fluid contained in the inner tube, the electric lines of the first rigid pipe element and the second rigid pipe element being electrically coupled to each other by the electric connecting line.

14. The network according to claim 13, wherein the inner section has a part protruding outside the outer shell at least at one of the first end and the second end, the coupling comprising a cover coupled to the outer shell and the outer tube to cover the protruding part.

15. The network according to claim 14, wherein the electric connection between the electric line present in at least one of the first rigid pipe element and the second rigid pipe element on the one hand, and the electric connecting line on the other hand, is positioned between the protruding part and the cover.

16. A method for assembling a pipe network for conveying a fluid below an expanse of water, comprising the following steps:
    providing a coupling according to claim 1;
    fastening a first rigid pipe element to a first end of the inner section;
    fastening a second rigid pipe element to a second end of the inner section;
    connecting a third rigid pipe element to the inner branch;
    electrically coupling at least one first electric line designed to heat the fluid present in the first rigid pipe element, and the electric connecting line present in the coupling;
    electrically coupling at least one second electric line designed to heat the fluid present in the second rigid pipe element, and the electric connecting line present in the coupling.

17. The coupling according to claim 8, wherein the outer shell is made in a single piece.

\* \* \* \* \*